United States Patent [19]

Ongkiehong et al.

[11] Patent Number: 4,486,864
[45] Date of Patent: Dec. 4, 1984

[54] METHOD FOR MARINE SEISMIC EXPLORATION

[75] Inventors: Leo Ongkiehong; Willem Huizer, both of Rijswijk, Netherlands

[73] Assignee: Shell Oil Company, Houston, Tex.

[21] Appl. No.: 284,854

[22] Filed: Jul. 20, 1981

[30] Foreign Application Priority Data

Sep. 8, 1980 [GB] United Kingdom ............... 8028953

[51] Int. Cl.³ ............................................... G01V 1/38
[52] U.S. Cl. ...................................... 367/23; 181/107; 181/110; 181/111
[58] Field of Search ............................. 367/2, 20-23, 367/144, 42, 45; 181/110, 111, 120, 121, 123, 107

[56] References Cited

U.S. PATENT DOCUMENTS

| | | | |
|---|---|---|---|
| 3,284,763 | 11/1966 | Burg et al. | 367/45 |
| 3,351,899 | 11/1967 | Luehrmann et al. | 367/23 |
| 3,413,596 | 11/1968 | Backus et al. | 367/21 |
| 3,437,170 | 4/1969 | Brock et al. | 181/120 |
| 3,602,878 | 8/1971 | Sullivan | 367/23 |
| 4,004,267 | 1/1977 | Mayne | 367/60 |
| 4,146,870 | 5/1977 | Ruehle | 367/20 |
| 4,208,732 | 2/1976 | Ruehle | 367/42 |

Primary Examiner—Maynard R. Wilbur
Assistant Examiner—K. R. Kaiser

[57] ABSTRACT

A method for marine seismic exploration, comprising the steps of first discharging simultaneously a set number of seismic sources having a known volume $V_1$, resulting in several seismic waves with substantially identical form which after reflection by a same series of reflection points are detected by hydrophones as a sum signal of the individual emitted source waves having a frequency range $f_1$. The sum signal is subsequently filtered by means of a suitable filter operation having a frequency range $f_1$, resulting in a sum signal having substantially equal phase of the individual components in the frequency range $f_1$, next discharging simultaneously a set number of seismic sources having a known volume $V_2$, different from volume $V_1$, resulting in several seismic waves with substantially identical form which after reflection are detected by hydrophones as a sum signal of the individual emitted source waves having a frequency range $f_2$. The sum signal is filtered by means of a suitable filter operation having a frequency range $f_2$, to obtain substantially equal phase of the individual components in the frequency range $f_2$, then repeating the abovementioned procedure of discharging simultaneously seismic sources having a known volume, detecting the several seismic waves after reflection and filtering the sum signals in a suitable way with seismic sources having mutually different volumes $V_3$, $V_4$–$V_n$ respectively. Finally, "stacking" the obtained signals, which results in a final "stacked" sum signal having a frequency range $f_1$–$f_n$.

10 Claims, 6 Drawing Figures

METHOD FOR MARINE SEISMIC EXPLORATION

BACKGROUND OF THE INVENTION

The invention relates to a method for marine seismic exploration, in which an array of seismic sources is used, in particular an air gun array comprising a plurality of air guns. The seismic method is a known geophysical exploration method to investigate the character of subsurface earth formations and more particularly to survey subterranean formations.

In seismic surveys seismic waves are generated periodically at preselected locations of the earth's surface and various characteristics of the waves, as they enter the earth and are reflected or refracted from subsurface earth strata, are measured.

The waves are detected by sensitive instruments, placed at varying distances from the preselected locations and are subsequently converted into electrical signals which may be further processed to derive data. The data may be plotted to obtain a picture or map of the investigated area, which may indicate the presence, if any, of structural traps capable of holding hydrocarbons like oil and/or gas.

The amplitude of the seismic waves of interest is a function of the size of the source and it will be clear that a wave having a relatively high amplitude may be studied easier than a wave having a lesser amplitude. A well known method of generating seismic waves is detonation of one or more charges of dynamite or other suitable explosive, embedded at predetermined locations in the earth.

However, marine seismic exploration is complicated by certain problems, which either do not exist or are relatively unimportant in land seismic exploration.

For example, it will be clear that detonation of a charge of dynamite in a marine environment may cause destruction to marine life.

To avoid such problem it has now become a usual practice in marine seismic exploration to use non-dynamite seismic sources, for example air guns. The air guns are towed behind a marine vessel by means of a towing cable and the air guns may suddenly release confined volumes of high pressure gas. This produces acoustical pressure pulses having a certain acoustic energy, that are converted to seismic waves as they enter the earth. The acoustic signal, generated by an air gun, shows a series of pressure pulses resulting in a corresponding oscillatory frequency spectrum having a fundamental frequency which is related to the amount and pressure of released gas volume. Moreover, air guns ae low intensity energy sources, so the acoustic energy waves produced by an air gun will have low amplitude and any electrical signal derived therefrom will have a relatively low signal-to-noise ratio. The signal strength produced by an air gun is several orders of magnitude less than that generated by a dynamite explosion or using other suitable explosives. These features make a single air gun less effective as a seismic source.

Moreover, marine seismic exploration technology requires a way of detecting seismic waves, which involves added noise. For example, when submerged areas are explored, the detectors cannot normally be fixedly located so as to detect a number of sources of equal significance.

Instead, it is conventional in marine seismic exploration to locate the detectors in a continuously towed streamer cable, which extends from the rear of a towing vessel. The acoustic waves reflected from subsurface formations are detected, while the vessel is proceeding along a prescribed course over the area of interest. However, such a procedure produces towing noise that lowers the quality of the signals to be obtained.

To improve both the signal strength and the signal shape it has been proposed to use a plurality of seismic sources disposed in an array, in particular an array of air guns. It has been found advantageous in marine seismic exploration to generate a plurality of acoustic waves from such an array in order to provide a composite acoustic wave of satisfactory amplitude and frequency content. Air guns having various volume capacities are generally used in such arrays in order to produce a composite acoustic wave having a broad frequency band, as air guns of various volumes generate acoustic waves with different frequency spectrum and corresponding phase spectrum. The frequency content and in particular the fundamental frequency of the generated acoustic wave is dependent upon the volume capacity of the air gun.

To provide a full spectrum of high energy acoustic pulses it is desirable to generate a number of acoustic waves of various fundamental frequencies. Several arrays have been designed and implemented using an increasing number of guns and an increasing amount of compressed air power. The source strength has been gradually increased and adequate levels are now available.

However, problems associated with noise appearance and loss of useful acoustic wave energy in water still exist and are not solved satisfactorily by the prior art. For example, meaningful information contained by seismic waves directly reflected from the ocean bottom is often masked due to the reception of horizontally travelling noise caused by reflections of horizontal seismic waves from underwater obstacles and the like. The high frequency radiation in more horizontal directions should be suppressed to avoid water trapped noise to dominate the seismic record. However, after this it might well be that still a significant amount of additional energy is needed to overcome the streamer noise and to compensate for non-elastic losses.

Further, present day air gun arrays are designed to emit shot signals to improve the spectrum of the signal and its determination. This may be achieved by cancelling the "tail energy" of the signal which is partly a destructive exercise and physically means a loss of possible useful energy.

SUMMARY OF THE INVENTION

Accordingly, it is an object of the present invention to provide a method for marine seismic exploration, which provides seismic signals of high quality. More particularly, it is an object of the method according to the present invention to provide an improved signal-to-noise ratio of the seismic signals. Further, it is another object of the present invention to provide a method for marine seismic exploration which reduces the loss of useful acoustical energy.

Still another object of the invention is providing a method for marine seismic exploration, allowing amplification of the energy in a desired frequency band, particularly high frequency energy.

Still another object of the invention is providing a satisfactory signal by using smaller air quantities than conventional techniques.

Still another object of the present invention is providing a method for marine seismic exploration, which achieves an increase in effective source strength.

The invention provides a method for marine geophysical exploration, in which a seismic source array comprising a plurality of seismic sources is used. The method comprises the steps of first discharging simultaneously a number of seismic sources having a determined volume $V_1$. The resulting several seismic waves with substantially identical form after reflection by the same series of reflection points are detected by hydrophones as a sum signal of the individual emitted seismic source waves having a frequency range $f_1$. The sum signal subsequently is filtered by means of a suitable filter operation having a frequency range of $f_1$, resulting in a sum signal having substantially equal phase of the individual components in the frequency range $f_1$ next discharging simultaneously a determined number of siesmic sources having a determined volume $V_2$ different from the above-mentioned volume $V_1$. The resulting seismic waves with substantially identical form after reflection are detected by hydrophones as a sum signal of the individual emitted seismic source waves having a frequency range of $f_2$. The sum signal is filtered by means of a suitable filter operation having a frequency range $f_2$, to obtain substantially equal phase of the individual components in the frequency range $f_2$. Then repeating the above-mentioned procedure of discharging simultaneously seismic sources having a known volume, detecting the several seismic waves after reflection and filtering the sum signals in a suitable way with seismic sources having mutually different volumes $V_3$, $V_4$–$V_n$ respectively. The filtered signals subsequently "stack" the obtained signals, which results in a final "stacked" sum signal having a frequency range $f_1$–$f_n$.

In a preferred embodiment of the invention, air guns are used as seismic sources. In the following explanation the term "air gun" will be used, but it should be clear that the invention is not restricted thereto and other sources could be used.

The invention is in particular based upon the application of phenomena known as "frequency multiplxing the shot's energy" and "zero-phasing prior to final summation" or "stacking". "Stacking" as such is a known technique of processing seismic signals and will not be described further. "Frequency multiplexing of shot energy" is a way of rearranging in time and frequency the emission of shot energy.

The "frequency multiplexed" mode of shooting implies first discharging simultaneously a determined number of guns having a volume $V_1$, followed by discharging simultaneously a determined number of guns having a volume $V_2$, etc.

The guns may be divided in groups, each group consisting of guns having the same volume. It should be emphasized that the number of the guns to be discharged of each group may vary, so $4V_1$, $5V_2$, $6V_3$, etc. may be discharged during the operation.

In one embodiment of the invention only one group of air guns having an adjustable volume or an adjustable operating pressure may be used.

The simultaneous discharging of a number of air guns having the same volume results in the same number of acoustic wave fronts having a substantially identical form. The acoustic waves interfere with each other resulting in a sum wave with a frequency range depending upon the size of the individual equivalent volumes of the said air guns, and are substantially detected by a hydrophone. Thus, during the shooting procedure several separate sum signals are obtained, each sum signal having a known mutually different frequency range. In the "frequency multiplex" mode a number of times more energy in one frequency range per shot is applied by using a number of identical guns and thus producing a number of times more signal amplitude in that particular frequency range per shot. Thus, rather than producing a full spectrum with each shot, which is a conventional method using air guns having different sizes which are discharged simultaneously, the invention emphasizes the respective frequency ranges sequentially but with a number of times higher specific energy input per frequency range.

The respective separate sum signals each having a particular frequency range are filtered in any suitable way to remove noise outside the said frequency range and to eliminate certain phase shifts, which may exist in the frequency range of each individual obtained sum signal. The removal of the phase shifts avoids a destructive interference because of overlapping signal spectra with different phase spectra. This may be carried out in such a way that the separate sum signals are "zero-phase processed" which means that the said sum signals are converted into their zero-phase equivalent by means of a suitable zero-phase operator. The zero-phase operator has to be derived from the shape of the actual outgoing signal (which is the undistorted signal without noise). For this purpose for example the nearby signal, obtained by firing only one gun or a plurality of identical guns, may be used.

In this way the whole spectral band is aligned before final summation or "stacking", so that all energy stacks in phase.

The several signal processing operations after the seismic waves having been detected by the hydrophones and converted into electric signals may be carried out by a computer.

Subsequently, the obtained signals are "stacked" together to a final sum signal covering the whole frequency range of interest.

BRIEF DESCRIPTION OF THE DRAWINGS

The present invention will now be described by way of example in more detail with reference to the drawings, in which.

DESCRIPTION OF PREFERRED EMBODIMENT

Figure 1:
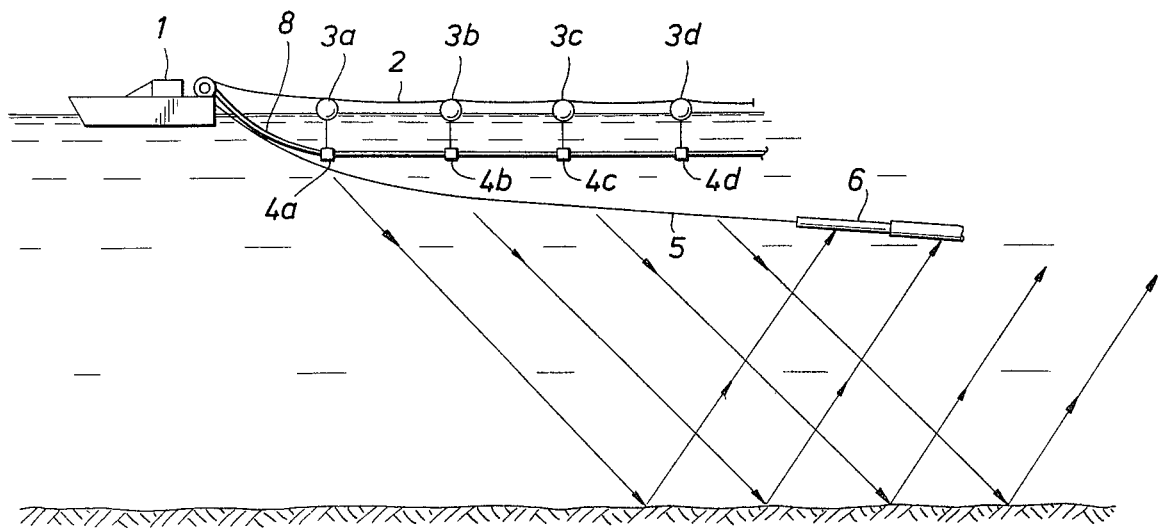
FIG. 1 represents schematically an example of a conventional marine seismic exploration system.

Referring now to FIG. 1, an example of a conventional marine seismic exploration system is shown.

A marine vessel 1 towing a cable 2 is shown, along which cable a plurality of floats 3a-d are affixed at spaced intervals. Floats of any design or configuration suitable for the purpose may be used in the application of the invention. It will be clear for those skilled in the art that any desired number of floats may be used. The cable 2, which is used for pulling the floats through the water may be connected to the towing vessel 1 in any manner suitable for the purpose, for example such as by means of a reel, which is controlled by a suitable motor.

Seismic sources 4a-d, for example air guns, are attached by suitable links from respective ones of the floats 3a-d. It will be clear for those skilled in the art that each float may carry an array of seismic sources consisting of a plurality of air guns. Each air gun is supplied compressed air or other suitable high-pressure fluid by a line 8, comprising high-pressure conduits and electric leads for transmission of signals which may be attached at one end to a compressor (not shown), located aboard the vessel 1. It will be clear that separate lines for each air gun may be used, if desirable. The vessel 1 also tows a cable 5 being attached to a streamer 6 which contains a plurality of acoustic receivers such as hydrophones, which emit electric signals in response to the reception of acoustical reflection of the acoustic waves from the air guns 4a-d. The cable 5 comprises the required electric leads (not shown) for the transmission of the electric signals to the vessel 1. The streamer 6 may be provided with equipment known per se, such as electronic signal amplifiers, control equipment for controlling the towing depth, and means for controlling the course of the streamer. The electric signals are received onboard the towing vessel 1 and are subsequently recorded by means of suitable equipment, such as amplifiers, filters and recorders (not shown) and the electric leads of the cable 5.

It will be clear for those skilled in the art that the above procedure is not the only one being possible. For example, the seismic source array may be towed by a first marine vessel whereas, if desired, a second marine vessel may tow the streamer cable provided with the detectors.

More than one streamer may be used for receiving the wave reflections returning from the area being investigated. The streamers may be towed in side-relationship, or one behind the other, or in any other configuration suitable for the purpose.

The cable 5 may be connected to the towing vessel in any manner suitable for the purpose, such as by means of rotatable cable drums. Further, any amount and configuration of seismic sources that is suitable for the purpose may be applied. The same applies for the type of seismic source used.

Figure 2:
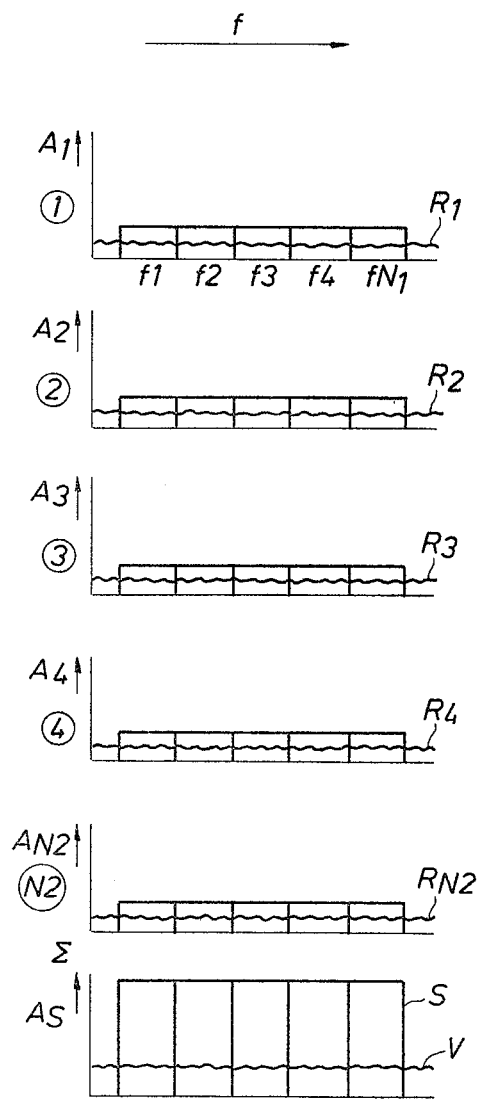
FIG. 2 represents several examples of idealized frequency curves of the shot energy of an air gun array obtained according to the conventional shooting technique.

Referring now to FIG. 2 the amplitudes $A_i (i=1-N_2)$ of a certain number of acoustic seismic pulses as obtained according to the conventional method of subsequently shooting of a set of different volume air guns (vertical axis) as a function of frequency f (horizontal axis) are represented. It is assumed that the acoustical pulses are obtained in an environment with uncorrelated ambient noise. The ambient noise level $R_i (i=1-N_2)$ is also represented. The signals obtained by subsequent shots (1 to $N_2$) are represented below each other, whereas the signal S represented at the bottom is a summation of the signals, obtained by the subsequent shots. Any number of subsequent shots suitable for the purpose may be possible.

As already mentioned in the above in the conventional technique a set of different volume air guns is discharged simultaneously, the volumes having been chosen such that the total desired frequency spectrum $f_1-f_{N2}$ is covered. Each individual gun has a known volume for supplying a specific part $f_i$ of the spectrum and emits a limited spectral frequency band $f_i (i=1-N_1)$ (sub-band) depending upon its volume and the total desired spectrum is the subsequent series of these individual sub-bands $f_1$. It will be clear that any desired number of guns may be used. From FIG. 2 it will be clear that in this example $N_1 = N_2 = 5$.

For the sake of simplicity it is assumed in FIG. 2 that each gun emits a rectangular limited spectral band $f_i$. In general, a number of $N_1$ guns, each gun having different volume, is used and consequently $N_1$ sub-bands are covered in discharging simultaneously the $N_1$ air guns having different volumes. This procedure is repeated $N_2$ times which results in $N_2$ shot records of the total spectrum and subsequently $N_2$ of these conventional shot records are finally summed, each shot record however containing the same level of ambient noise $R_i (i=1-N_2)$.

Compared with a single shot record the signal amplitude $A_s$ in the final sum signal is $N_2$ times higher while the expectation value for the amplitude V of the noise is $\sqrt{N_2}$ higher which may be shown statistically. In this way a gain of $\sqrt{N_2}$ in signal-to-ambient noise may be achieved. As already mentioned in the above this process of finally summing the electrical signals which are derived from each of the detectors to produce a single signal having a larger amplitude is called "stacking". It will be clear that in practice the signals have no exact rectangular form, but have an oscillating character.

Figure 3B:
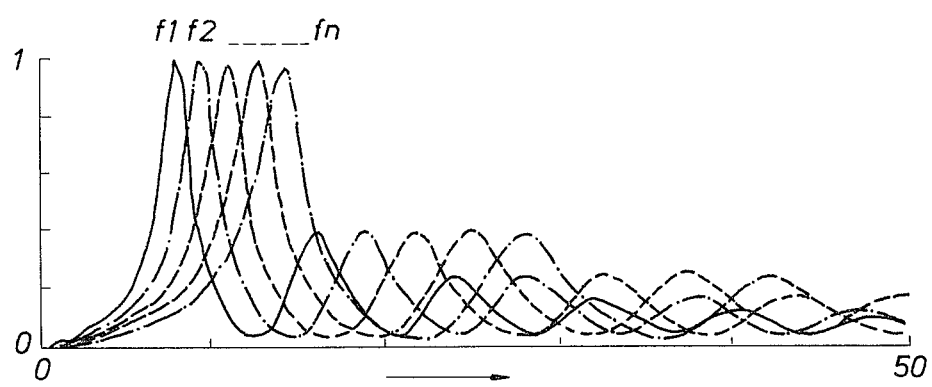
FIG. 3(b) represents an example of real frequency curves of FIG. 3(a).
Figure 3A:
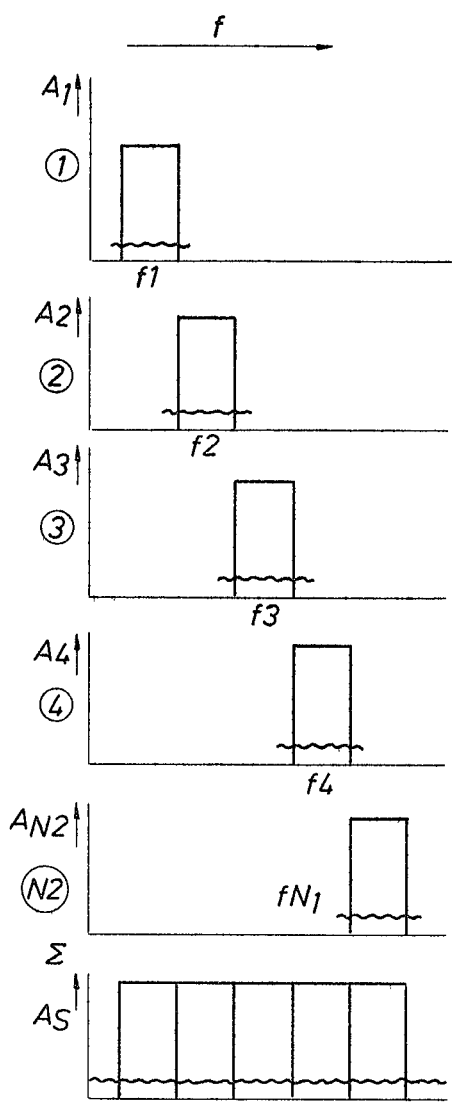
FIG. 3(a) represents several examples of idealized frequency curves of the shot energy of an air gun array obtained according to the method of the invention.

Referring now to FIG. 3(a) the results of the method according to the invention are shown. The horizontal and vertical axes represent the same quantities amplitude and frequency as in FIG. 2. However, with each shot only one frequency range $f_i$ is covered, the amplitude $A_i$ of the signal being larger than in FIG. 2.

By discharging simultaneously a predetermined number, for example $n = N_1$ guns, each gun having the same volume $V_i$, $N_1$ times more energy in one particular sub-band $f_i$ per shot is generated, thus producing $N_1$ times more signal amplitude in that particular sub-band per shot. Thus, rather than producing a full spectrum with each shot which is done by the conventional method, the invention emphasizes the sub-bands $f_i$ sequentially but with a $N_1$ times higher specific energy input per sub-band. After $N_2$ shots the entire desired spectrum ($f_1-f_n$) has been covered. This is represented by the sum signal at the bottom of FIG. 3(a) which shows an equivalent signal amplitude but a $\sqrt{N_2}$ times lower ambient noise level as compared with the conventional method. It will be clear for those skilled in the art that n may have any value suitable for the purpose.

FIG. 3(b) represents an example of real frequency curves of FIG. 3(a). The relative amplitude (vertical axis) has been represented as a function of the frequency in Hertz (horizontal axis).

Any suitable filtering operation may be applied to remove noise from the received signals. This filtering operation may be adapted continuously to the frequency sub-band being used. In an advantageous embodiment of the invention a selective band pass filter may be used. The gain in the signal-to-noise ratio has been obtained by the selective filtering, which allows the ambient background noise to appear only once per sub-band in a series of $N_2$ recordings.

Another result of the filtering process is zero-phasing, which will be described referring to FIG. 4(a) and FIG. 4(b).

Figure 4A:
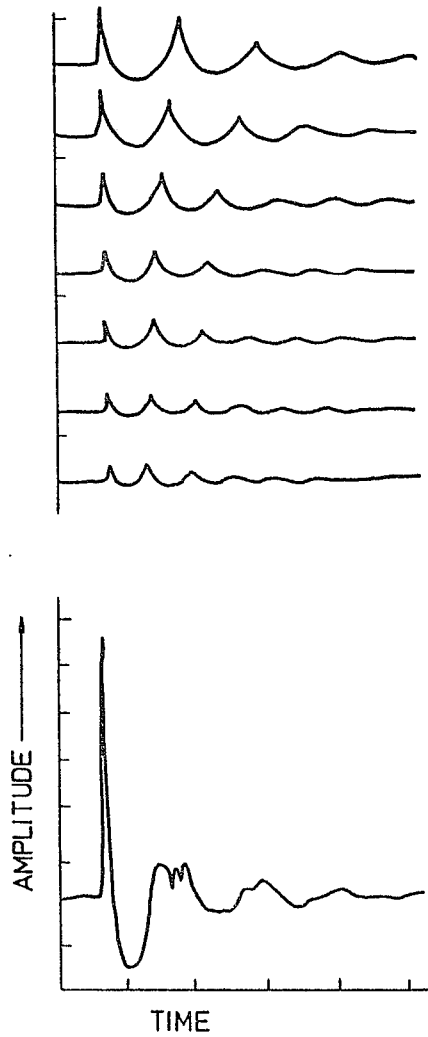
FIG. 4(a) shows the conventional summation of signals derived from an air gun array.

FIG. 4(a) represents the results of conventional summing of several signals, each signal having its own specific frequency spectrum and phase spectrum to produce an enhanced pulse signal. FIG. 4(b) represents the results of zero-phasing prior to final summation. The vertical axis represents the amplitude of the signals, whereas the horizontal axis represents time. The examples of FIG. 4(a) represents from top to bottom signals having a mutually different phase. The final conventional summation of these signals represented by the summation signal at the bottom of FIG. 4(a) provides a signal having a relatively low amplitude.

In this example a 7-gun array has been used, but it will be clear to those skilled in the art that any other suitable number of seismic sources may be used. The sources, each member producing a band limited signal, are combined to produce a broad frequency spectrum. The spectral shape of the individual gun signals however, implies that the spectral-and signal-shaping has been achieved with a certain degree of desctructive interference, since the guns are producing overlapping signal spectra with different phasespectra as will be clear from FIG. 3(b). According to the invention this destructive interference is avoided by firing guns having different volumes individually and convert all signals into their zero-phase equivalent prior to final summation ("stacking").

Figure 4B:
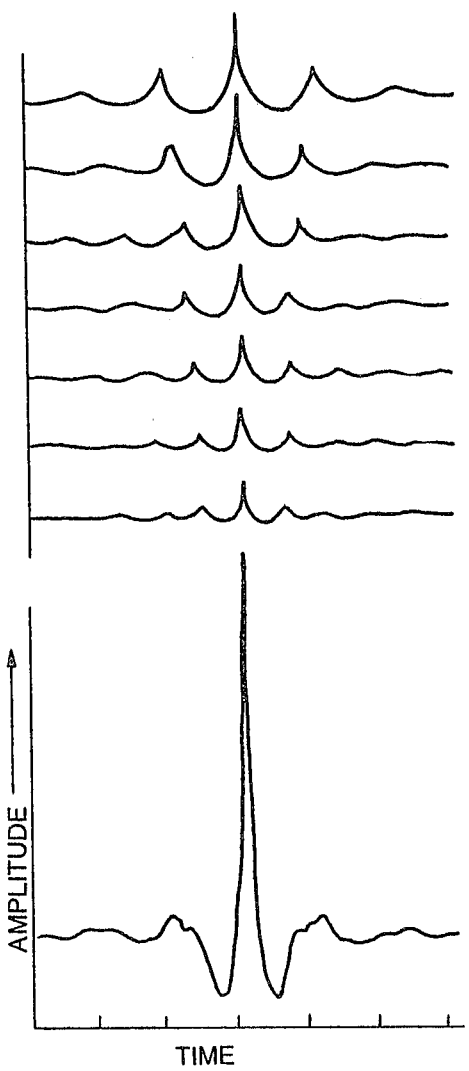
FIG. 4(b) shows the "zero-phasing" prior to final summation or "stacking" of the same signals according to the invention.

In this way the whole spectral band is aligned before summation, so that all energy stacks in phase and a larger signal amplitude may be achieved as will be clear from FIG. 4(b).

As already indicated in the above the real spectrum shape of an air gun is not a square box but has an oscillatory character. A suitable selective filter for the method of the invention may therefore be a band pass filter providing a frequency weighing according to the emitted spectrum.

According to an advantageous embodiment of the invention selective filtering and zero-phasing of the signals may be combined in one process by cross-correlating the trace with the outgoing signal (which is the undistorted signal without surface reflections and without noise). Measurement of the outgoing signal may be performed in several ways for example by using a calibrated hydrophone suspended from the seismic source. Another possibility is simulating a source signal by means of a suitable computer operation and carrying out a cross-correlation with the received hydrophone signal. Such measurements are known to those skilled in the art and will not be described in detail. Cross-correlation is not only an optimum frequency filter process for signal/noise ratio enhancement, but simultaneously also a zero-phase operator.

It should be emphasized that the detected signals, which are recorded and processed may be obtained by any suitable marine seismic exploration system, using an array of seismic sources.

Various modifications of the invention will become apparent to those skilled in the art from the foregoing description and accompanying drawings. Such modifications are intended to fall within the scope of the appended claims.

We claim:

1. A method for marine seismic exploration in which a seismic source array comprising a plurality of seismic sources is used, said method comprising:
   discharging simultaneously a preset number of seismic sources, each having a known volume $V_1$, said sources producing seismic waves having substantially identical form and a frequency range $f_1$;
   detecting said seismic waves after they have been reflected by a series of reflection points and providing a sum signal;
   filtering said sum signal using a filter having a frequency range $f_1$ to provide a signal having substantially equal phase of the individual components in the frequency range $f_1$;
   repeating the above steps using a preset number of seismic sources, each having a known volume $V_2$ different than $V_1$ to produce seismic waves substantially identical form and a frequency range $f_2$;
   repeating the above steps using seismic sources having volumes $V_3$, $V_4$–$V_n$ and frequency ranges $f_3$, $f_4$–$f_n$; and,
   stacking the filtered sum signals to produce a final sum signal having a frequency range $f_1$–$f_n$.

2. The method of claim 1, wherein the seismic sources consist of air guns.

3. The method of claim 2, wherein the air guns of the air gun array are divided in groups, each group consisting of air guns having a same volume.

4. The method of claim 2, wherein air guns having an adjustable volume are used.

5. The method of claims 2, 3 or 4, wherein the number of air guns being discharged simultaneously during the operation is always the same.

6. The method of claims 2, 3 or 4, wherein the number of air guns being discharged simultaneously during the operation is variable.

7. The method of claims 1, 2, 3 or 4, wherein the filtering operation takes place by means of a band pass filter.

8. The method of claim 1, wherein the filtering operation provides substantially equal phase of the individual components of a sum signal having a determined frequency range by means of zero-phasing of the individual sum signals prior to "stacking".

9. The method as claimed in claim 8, wherein a cross-correlation of the detected signal with the undistorted measured source signal takes place.

10. The method as claimed in claim 8, wherein a cross-correlation of the detected signal with a computer-simulated source signal takes place.

* * * * *